United States Patent [19]
Cohn

[11] Patent Number: 5,857,322
[45] Date of Patent: Jan. 12, 1999

[54] HYBRID SOLAR AND FUEL FIRED ELECTRICAL GENERATING SYSTEM

[75] Inventor: Arthur Cohn, Palo Alto, Calif.

[73] Assignee: Electric Power Research Institute, Inc., Palo Alto, Calif.

[21] Appl. No.: 941,171

[22] Filed: Sep. 30, 1997

Related U.S. Application Data

[62] Division of Ser. No. 653,528, May 24, 1996, Pat. No. 5,661,236.
[51] Int. Cl.[6] .................................................. F02C 6/00
[52] U.S. Cl. ..................... 60/39.182; 60/641.8; 60/676
[58] Field of Search ........................ 60/39.182, 691.8, 60/676, 39.15, 39.181

[56] References Cited

U.S. PATENT DOCUMENTS

| | | | |
|---|---|---|---|
| 5,111,662 | 5/1992 | Nicolin et al. | 60/39.182 X |
| 5,444,972 | 8/1995 | Moore | 60/39.182 |
| 5,628,183 | 5/1997 | Rice | 60/39.182 |
| 5,727,379 | 3/1998 | Cohn | 60/39.182 |

*Primary Examiner*—Hoang Nguyen
*Attorney, Agent, or Firm*—Jerry Wright; Flehr Hohbach Test Albritton and Herbert LLP

[57] ABSTRACT

An electric power generation system combines a gas turbine generator with a solar power plant and utilizes the gas turbine exhaust for steam superheating and feed water heating only. The solar heater is only utilized for boiling or evaporation of feed water into steam, the feed water having previously been heated by a downstream portion of the turbine exhaust. In order to balance the disparity between the specific heats of water and steam to thus optimize the system, the steam is superheated by an upstream portion of the turbine exhaust to first drive a high pressure steam turbine and then reheated by the same exhaust over the same temperature range to drive a low pressure steam turbine.

6 Claims, 5 Drawing Sheets

HYBRID SOLAR AND FUEL FIRED ELECTRICAL GENERATING SYSTEM

This is a division of application Ser. No. 08/653,528 filed May 24, 1996, now U.S. Pat. No. 5,661,236.

The present invention is directed to a hybrid solar and fuel fired electrical generating system and more specifically, to where the fuel portion of the power plant is a gas turbine where in addition to generating electricity the hot exhaust gas of the turbine is used for producing steam in combination with the solar unit for driving steam turbine generators.

BACKGROUND OF THE INVENTION

Combined cycle electrical generating systems using solar and gas turbine units are probably known as illustrated in U.S. Pat. No. 5,444,972. In addition it is believed that Bechtel Corporation of San Francisco, Calif. have designs that have added to a standard General Electric gas turbine power plant (which by the way also used high pressure and low pressure steam turbines), a solar evaporator. However, in both of the above installations, there was no specific effort to optimize the overall system. Rather the solar energy portion of the system was merely added to the combined cycle, utilizing the original gas turbine steam generation equipment and cycle layout as originally designed for fuel firing.

OBJECT AND SUMMARY OF THE INVENTION

It is a general object of the present invention to provide an improved hybrid solar and fuel fired electrical generating system.

In accordance with the above object, there is provided an electric power generation system having a substantially closed feed water/steam path to provide a common mass flow comprising a gas turbine and generator having a hot exhaust gas stream. First heat exchanger means are at least partially located in a downstream portion of the hot exhaust gas for heating the feed water to substantially its evaporation temperature. Solar boiler means are connected to the first heat exchanger means for evaporating the feed water. A high pressure steam turbine generator is provided. Also a low pressure steam generator having a low pressure exhaust is connected to a condenser which thereby supplies the feed water. Second heat exchanger means located in an upstream portion of the hot exhaust gas of the turbine receives both evaporated feed water from the solar boiler means and also the low pressure exhaust of the high pressure steam turbine and superheats it to a predetermined temperature for driving both the high pressure and low pressure steam turbines. The absolute energy per degree of temperature rise supplied by the second heat exchanger means for superheating above the high pressure boiling point is substantially equal to the heat energy per degree of temperature rise provided by the first heat exchanger means to heat the feed water to the evaporation temperature and below the high pressure boiling point.

DESCRIPTION OF PREFERRED EMBODIMENT

Figure 1:
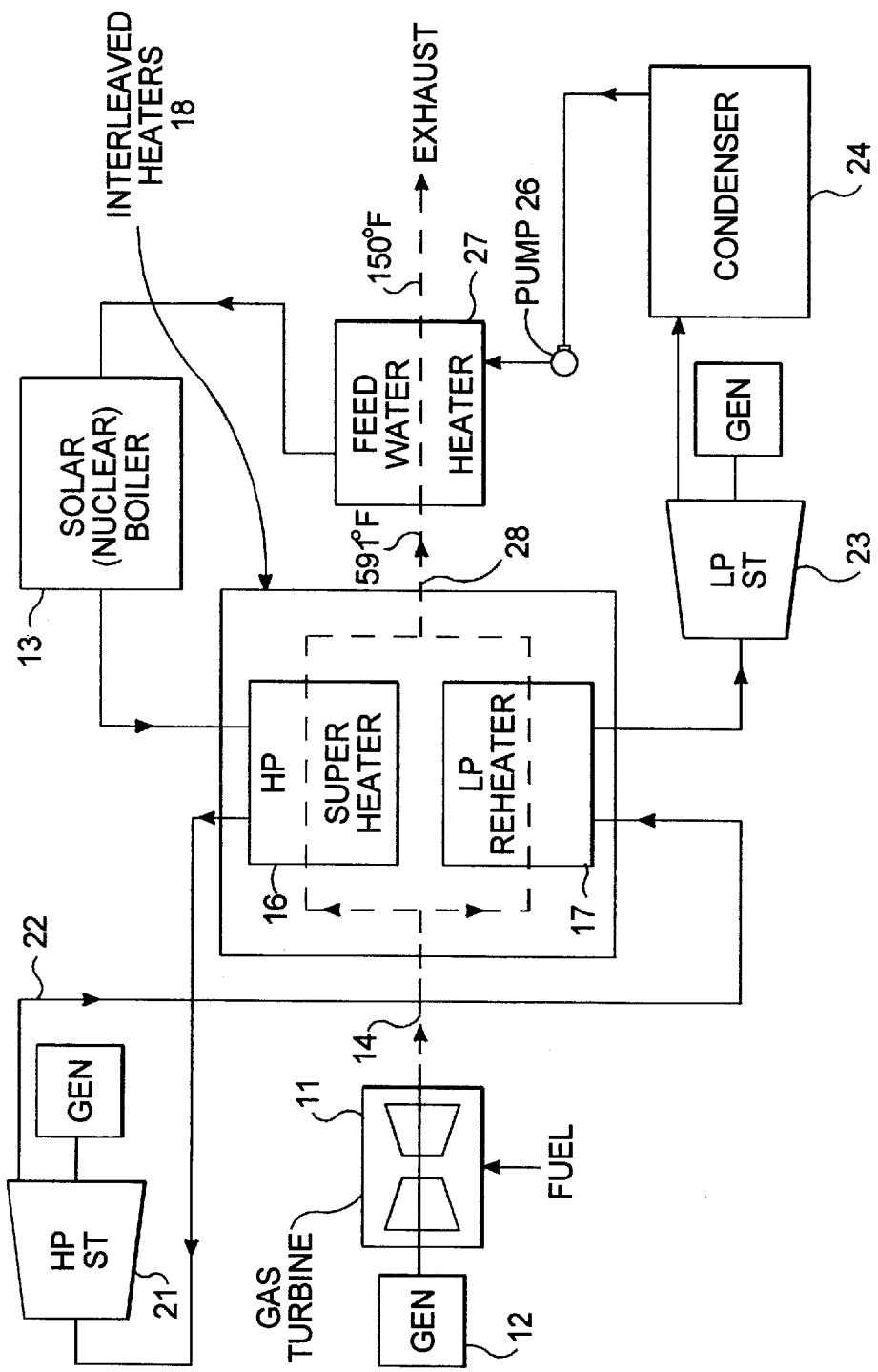
FIG. 1 is a schematic representation of the total system.

FIG. 1 illustrates the electrical power generation system of the present invention which has as its key components a fuel powered gas turbine driving a generator 12 and a solar boiler 13. As will become apparent the solar heat used in conjunction with the gas turbines exhaust gas heat, the gas stream being shown as the dashed line 14, will make much more steam power than can be made by using each separately, or in a combined or hybrid system as discussed above, which is not optimized. In general the present invention realizes that since the gas turbine exhaust heat has the characteristic of giving up one percent of its heat with a drop of one percent of its temperature from its given datum, it should not be used for boiling, which occurs at a constant temperature, but only for feed water heating to the evaporation temperature and also steam superheating. On the other hand, since solar heating occurs at close to a constant temperature it is best mainly used for boiling or bringing the feed water to its evaporation temperature. Thus as illustrated in FIG. 1, the solar boiler could as well be a nuclear boiler since that has the same type of characteristic; that is, a constant temperature even though heat is being removed from the system as contrasted with the gas turbine exhaust gas.

Referring now to the hardware implementation of the system of FIG. 1, the exhaust gas 14 of the gas turbine 11 first is routed to a high pressure super heater 16 and a low pressure reheater. As indicated these are actually interleaved heaters 18 in the form of tube sheets. High pressure super heater 16 superheats the high pressure steam generated by the solar boiler 13.

Thus the solar boiler temperature is near the evaporation temperature and super heater 16 heats the resultant steam up to the maximum approach temperature used to drive the high pressure steam turbine generator 21.

After expansion in the high pressure steam turbine 21 the exit line 22 is still superheated at the original exit temperature of solar boiler 13. The low pressure reheater 17 again reheats the steam to the maximum approach temperature and drives the low pressure steam turbine generator 23. The reheated steam is then expanded through the low pressure steam turbine to the condenser unit 24 and then after condensing the water is pumped by pump 26 to feed water heater (or heat exchanger 27). This is located in the downstream portion 28 of the gas turbine exhaust 14. With the use of this exhaust the feed water is again heated to up to near its boiling point and fed to the solar boiler 13 to complete the closed feed water/steam path. Since this is a closed path, of course, there is a common mass flow through the system. The super heater and reheater 16, 17 are located in the upstream or hotter portion of the hot exhaust gas stream 14.

Figure 2:
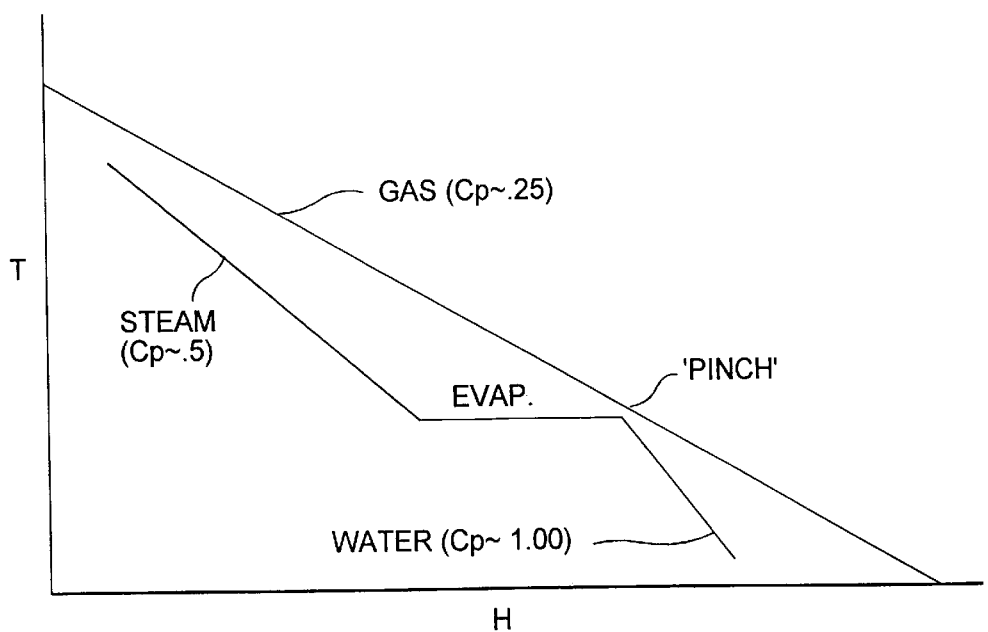
FIG. 2 is a graph helping to explain the concept of the invention.

Theoretically when using the exhaust gas heat of the gas turbine solely for water heating and super heating, it is desirable for the best thermodynamics to have close to a constant temperature difference between the turbine gas flow as it cools and the countercurrent water and steam flows as they heat up by taking heat from the gas flow. However, FIG. 2, which is a temperature-entropy (H) characteristic indicates an inherent problem. The exhaust gas has a specific heat (Cp) of about 0.25. On the other hand steam has a specific heat of about 0.5 and water of 1.00. This leads to an imbalance as the water has a specific heat of about twice the specific heat of the steam. Thus the amount of water flow heat pick up degree which would match the gas flow's heat pickup degree is only about half the amount of steam flow whose heat pickup per degree would match the gas flow's heat give up per degree.

Figure 3:
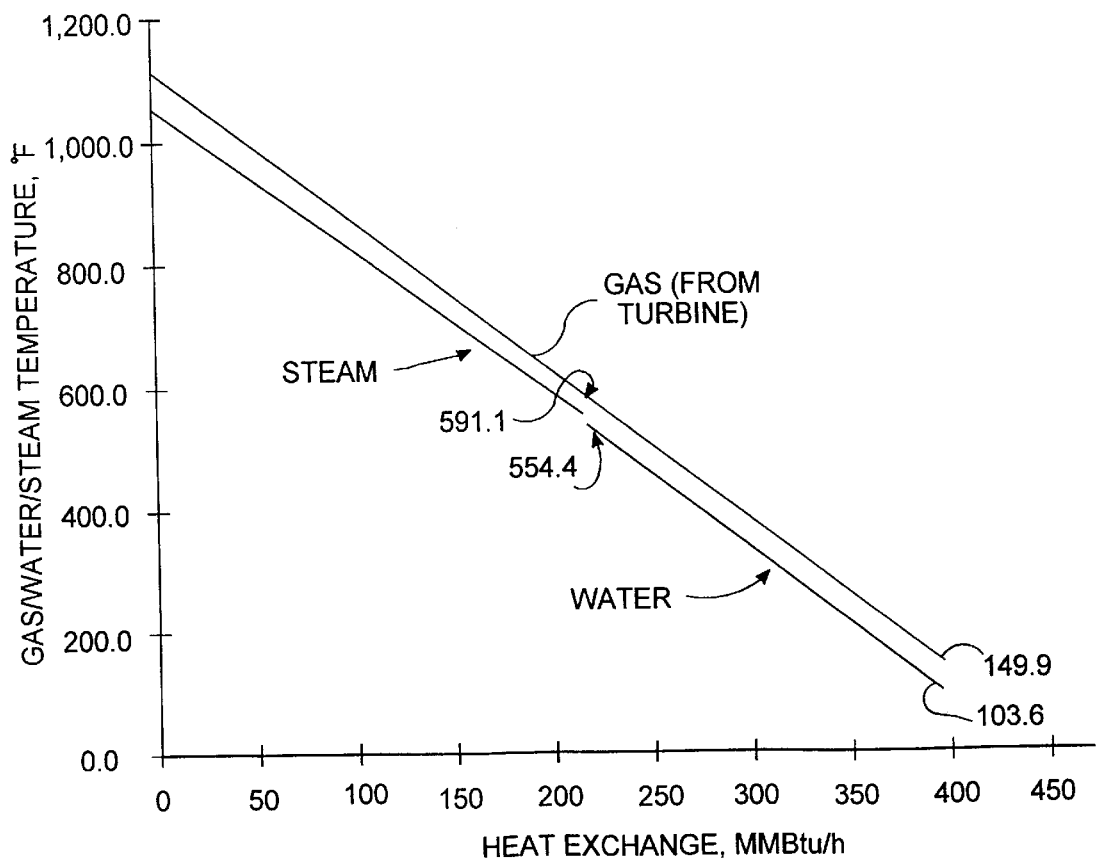
FIG. 3 is a characteristic curve illustrating the actual operation of the invention.
Figure 4:
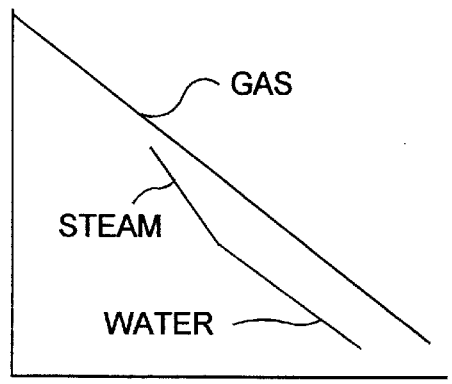
FIGS. 4 and 5 are curves similar to FIG. 3 illustrating theoretical nondesired operational modes.
Figure 5:
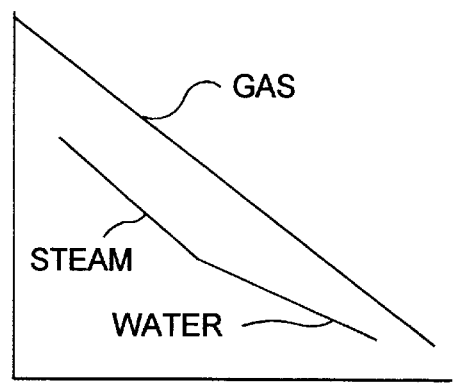

As stated above the ideal optimum thermodynamic situation is where there is a constant temperature in the heat exchange between the turbine gas flows and the steam and water. This is illustrated in FIG. 3 where the steam, water, and gas curves are shown with the horizontal axis being heat exchange in BTUs per hour and the vertical axis being in ° F. temperature. Specific temperature values are indicated for one example to be discussed below. The ideal characteristics of FIG. 3 can be realized as will be discussed in detail below by heating each pound of steam twice over the same temperature range. However, if this is not done, the curves of FIGS. 4 or 5 show theoretical undesired results. These curves are conceptual only and simplified; thus they do not match a real situation. Thus in FIG. 4 the water and gas counterflows are matched leaving a mismatch with the steam; in FIG. 5 the steam is matched leaving a mismatch with the water.

Figure 6:
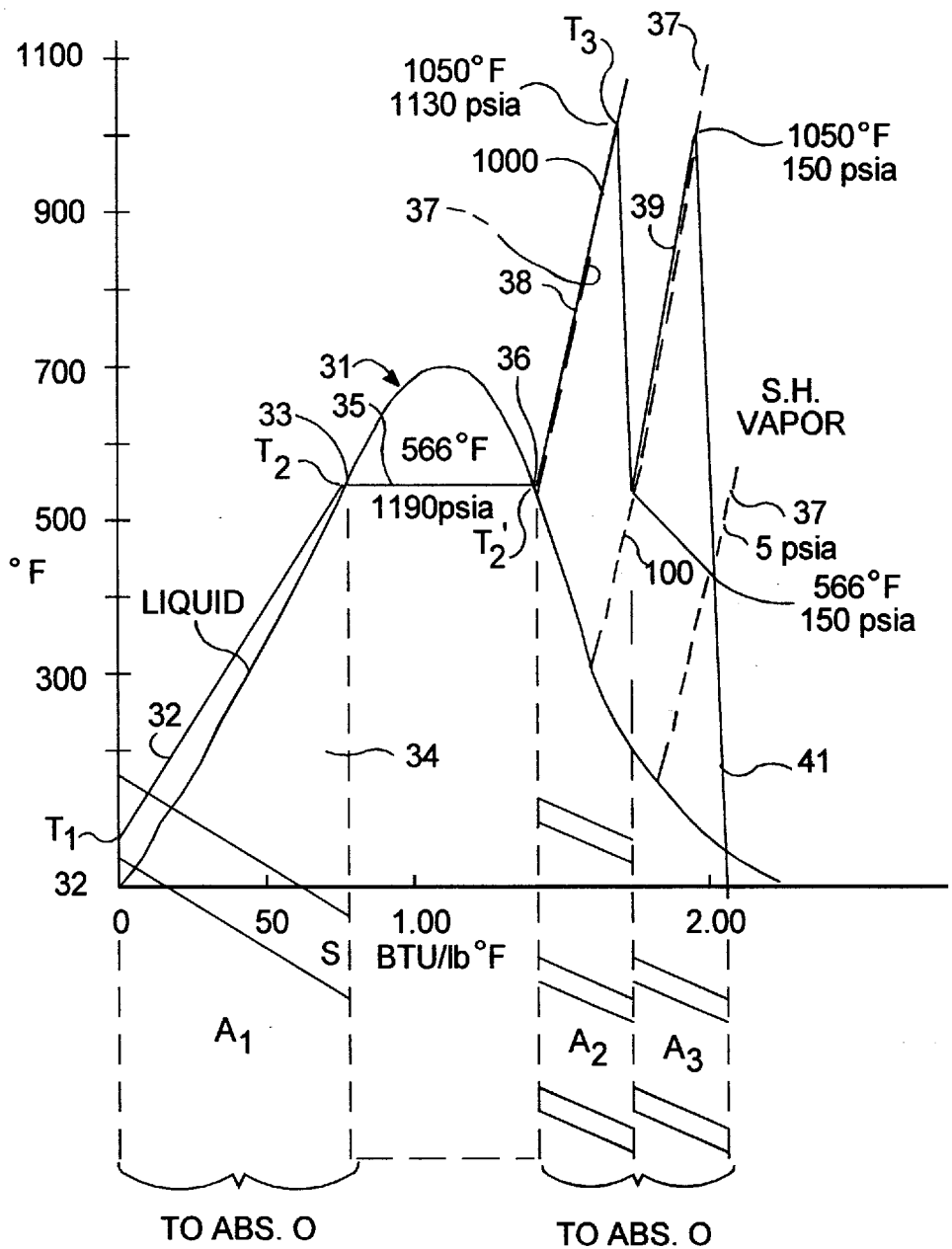
FIG. 6 is a temperature-entropy diagram illustrating the present invention.

The temperature-entropy characteristic of FIG. 6 succinctly illustrates the technique of the present invention which achieves the ideal characteristics of FIG. 3. The main curve 31 of FIG. 6 is a standard temperature-entropy curve where in the interior of the bell shaped curve is the wet region, on the left side is liquid and on the right is the dry region or superheat and vapor region.

Now relating the system of FIG. 1 to the chart of FIG. 6, the feed water heater 27 is illustrated by the curve 32 which heats the feed water up to its boiling point which is indicated at 33 and, for the example of the present invention is approximately 566° F. at a pressure of 1190 psia. The cross hatched portion $A_1$ under the curve up to 33 and going down to absolute zero temperature is the heat energy supplied by that stage. Then the horizontal line 35 is the latest heat of evaporation which occurs in the solar boiler 13 to change the phase of the water from liquid to vapor which occurs at 36. On the other side of the bell curve 31 the dashed line shown at 37 are isopressure lines at 5 psi, a 100 psia and 1000 psia. Substantially along the 1000 psi line the solid line 38 shows the operation of super heater 16 which superheats the steam up to the temperature indicated of 1050° F. at a pressure substantially similar to the original pressure 1130 psia. Then on line 22, this is dropped by typical valve means on the high pressure steam turbine and by the turbine action, per se, to the low pressure of 150 psia and 566°, the original evaporation temperature. The low pressure steam is again reheated by the low pressure reheater 17 as shown by the solid line 39 back to 1050° at substantially a pressure of 150 psi. And then the action of the low pressure turbine in conjunction with condenser 24 (see line 41) drops the exhaust down to substantially 1 psia at about 100° F. temperature. It is critical that this line 41 indicating the exhaust of the low pressure turbine 23 hits the curve 31 at the location indicated so that the temperature and pressure combination provides an exhaust which is not totally dry and not too wet.

Thus referring to the crosshatched portions, the heat added by the high pressure superheater 16 is shown by the area $A_2$ and the heat added by the low pressure reheater 17 by the area $A_3$. As shown by the equation it is desirable for optimum efficiency that area $A_1$ divided by the temperature rise, $T_2-T_1$ equal to the sum of $A_2$ and $A_3$ divided by the temperature rise, $T_3-T'_2$. When this is done it will effectively compensate for the difference between the specific heats of water and steam as discussed above to thus yield the idealized characteristic curves of FIG. 3.

To explain the foregoing by equation, the following three apply:

(1) $M * Cp_w = M * Cp_g$
(2) $\Sigma M * Cr_s = M * Cp_g$
(3) $\Sigma M * Cp_s = M * CP_w$
where M = Mass flow
Cp = Average specific heat Equation (1) shows the matching of the product of mass flow and specific heat of water with gas flow, and equation (2) the matching of the superheating steam to gas. Finally equation (3) is the necessary condition for equations 1 and 2 to hold. Since the specific heats of gas and water are not equal, (one is double the other) by superheating the steam twice, first at high pressure and then at low pressure equation (3) is effectively satisfied.

Thus, in general the following are design criteria: 1) steam is reheated twice compared to water, 2) the same temperature range is used for both the high pressure superheater 16 and the low pressure reheater 17; 3) the temperature of the solar boiler, given in the example of 566°, is chosen to provide an inexpensive solar boiler of the trough type (also the pressure of 1190 psia is chosen for good compatibility with the solar boiler output; 4) the low pressure turbine drop to the condenser is neither dry or too wet, 5) the inlet pressure to the high pressure turbine 21, for example, 1130 psia, is not too high for a commercial turbine; 6) the pressures of heaters 16 and 17 are chosen to provide the desired equality with feedwater heating.

A theoretical system has been designed and the attached Table I illustrates the operating parameters.

Figure 7:
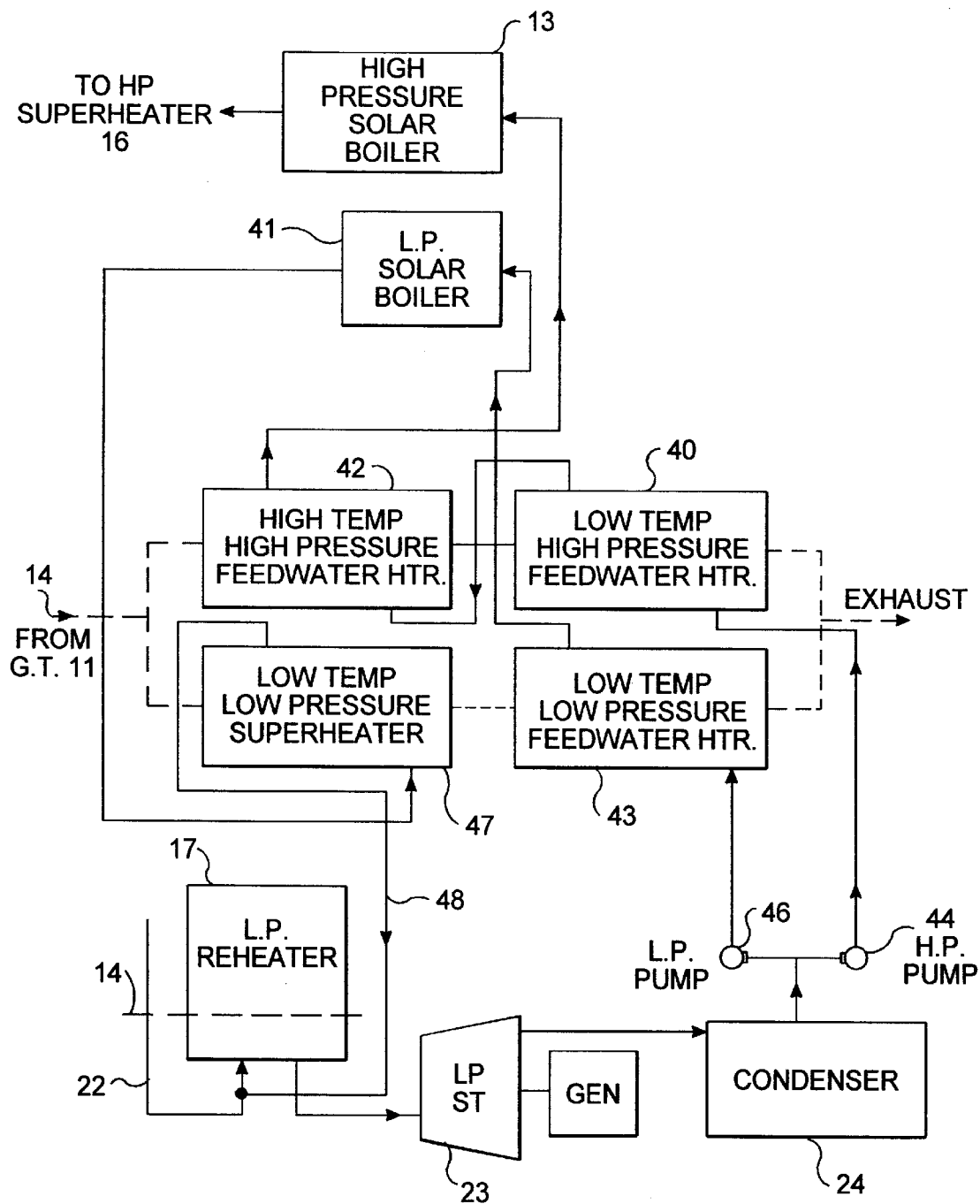
FIG. 7 is a schematic representation which is an alternative to FIG. 1.

As illustrated, for example, by the Table 1, the embodiment of FIG. 1 with the proper temperatures and pressures provides optimum efficiency. For example, in some installation a pressure of 2150 psia might provide superior efficiencies. However FIG. 7 illustrates an alternative which is a modification of FIG. 1 which uses an additional low pressure solar boiler 41 with a modified feedwater arrangement. This includes the existing feedwater heater which is now divided into low temperature/high pressure and high temperature/high pressure sections 40 and 42 and a low temperature/low pressure section 43. Sections 40 and 43 are fed via the high pressure pump 44 and low pressure pump 46, respectively, which receive feedwater from condenser 24. The high temperature section 42 again heats the feedwater to its evaporation temperature and then allowing the high pressure solar boiler 13 to change it to vapor. Then the output of boiler 13 goes to the high pressure superheater 16 as before. However in accordance with this modification the low temperature/low pressure section 43 now feeds the new low pressure solar boiler 41 which heats the feedwater to its evaporation point and then an additional new low temperature/low pressure superheater section 47 superheats the steam and couples it via line 48 to the input line 22 of the low pressure reheater 17.

Figure 8:
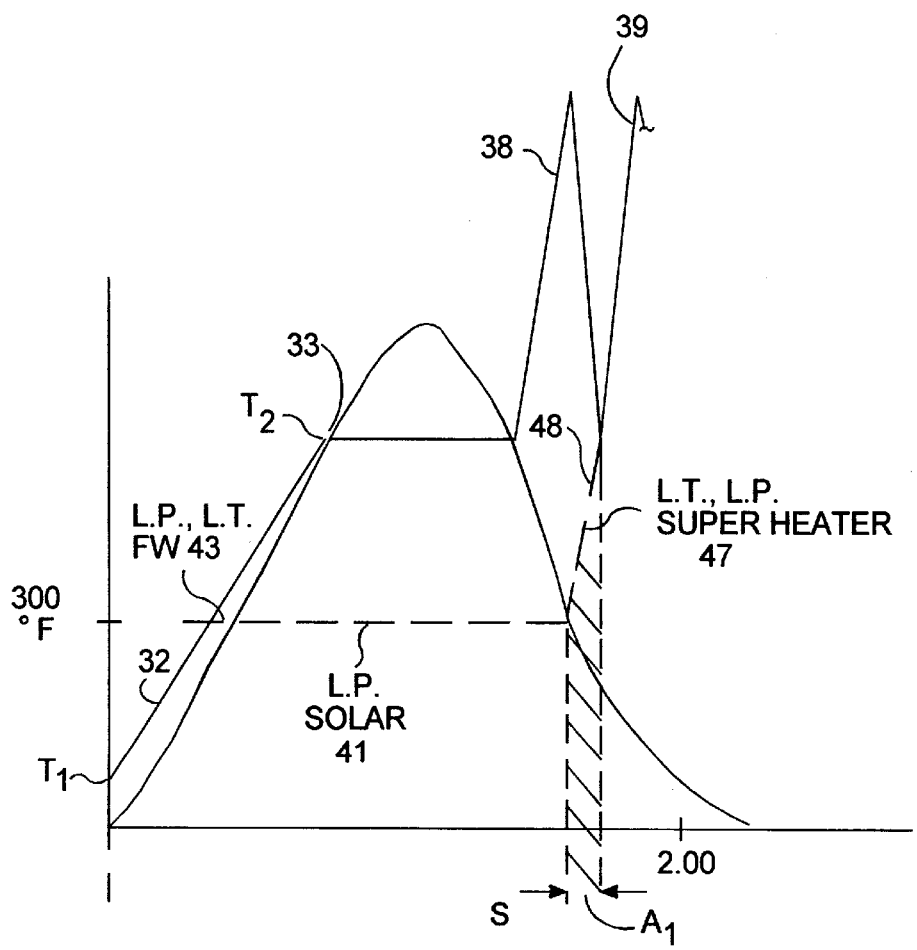
FIG. 8 is the diagram of FIG. 6 modified to illustrate FIG. 7.

The feedwater heating units 42 and 40 are sequentially in the high and low temperature portions of the exhaust stream 14 from gas turbine 11 as are superheater 47 and low temperature heater 43. Thus in effect two new heat supply sources have been provided as aptly illustrated by the temperature-entropy diagram of FIG. 8. Here the heat energy supplied to area 34 raising the feedwater to its evaporation temperature is that supplied by low pressure/low temperature heater 43; and then the low pressure solar boiler 41 supplies the latent heat of evaporation which then is fed to the superheater 47 and as illustrated by the line 48 merges with the isopressure line 39 which is actually the input 22 to low pressure heater 17 as illustrated in FIG. 7. The degree temperature rise supplied by superheater 47 is $A'_1$. Referring to the equation of FIG. 6 this would be respectively added to the left of the equation with an adjustment for mass flow. In this embodiment the balance of the equation occurs at the high pressure boiling point, also known as the "pinch" temperature. Referring to FIG. 6 this is about 566° F. Although it is believed that the technique of FIGS. 7 and 8 may be less efficient, it is illustrative as to how the concept of the invention in balancing the heating perunit temperature rise of the feedwater with the superheating can be accomplished in many different ways.

Thus an improved hybrid solar and fuel fired electrical generating system has been provided.

TABLE 1

| | |
|---|---|
| Superheater 16 Inlet Steam Temperature (F.) | 566 |
| Superheater 16 Outlet Steam Temperature (F.) | 1050 |
| Superheater 16 Inlet Gas Temperature (F.) | 1109 |
| Superheater 16 Outlet Gas Temperature (F.) | 591 |
| Reheater 17 Inlet Steam Temperature (F.) | 567 |
| Reheater 17 Outlet Steam Temperature (F.) | 1050 |
| Reheater 17 Inlet Gas Temperature (F.) | 1109 |
| Reheater 17 Outlet Gas Temperature (F.) | 591 |
| Feedwater Heater 27 Inlet Water Temperature (F.) | 104 |
| Feedwater Heater 27 Outlet Water Temperature (F.) | 554 |
| Feedwater Heater 27 Gas Inlet Temperature (F.) | 591 |
| Feedwater Heater 27 Gas Outlet Temperature (F.) | 150 |
| Solar Boiler 13 Duty (Btu/hr) | 2.30E + 0.8 |
| Solar Boiler 13 Steam Production (lb/hr) | 3.65E + 0.5 |
| Total Net Power (MW) | 141.74 |
| GT 11 Power (MW) | 70.95 |
| ST 21, 23 Power (MW) | 70.8 |
| GT 11 Heat Input (Btu/hr) | 6.84E + 0.8 |
| Plant Heat Rate (Btu/hr) | 4828 |
| Plant Efficiency (%) | 70.7 |
| Adjusted Heat Rate (Btu/hr) | 6447.7 |
| Standard Steam Turbine Power | 108.3 |
| Steam Turbine Outlet Quality | 0.998 |
| Solar Boiler Pressure (Psia) | 1190 |
| HP Steam Turbine Inlet Pressure (Psia) | 1130.5 |
| HP Steam Turbine Reheat Pressure (Psia) | 159 |
| LP Steam Turbine Inlet Pressure (Psia) | 150.4 |
| Steam Turbine Condenser Pressure (Psia) | 1 |

What is claimed is:

1. An electric power generation system having a substantially closed feed water/steam path to provide a common mass flow comprising: a gas turbine generator having a hot exhaust gas stream:

first heat exchanger means at least partially located in a downstream portion of said hot exhaust gas for heating said feed water to substantially its evaporation temperature;

solar boiler means connected to said first heat exchanger means for evaporating said feed water;

a high pressure steam turbine generator;

a low pressure steam turbine generator having a low pressure exhaust connected to a condenser which thereby supplies said feed water;

second heat exchanger means located in an upstream portion of said hot exhaust gas of said turbine for receiving evaporated feed water from said solar boiler means and also the low pressure exhaust of said high pressure steam turbine and superheating it to a predetermined temperature for driving both said high pressure and low pressure steam turbines;

the absolute heat energy per degree of temperature rise supplied by said second heat exchanger means for superheating above the high pressure boiling point being substantially equal to the heat energy per degree of temperature rise provided by first heat exchanger means to heat said feed water to said evaporation temperature and below said high pressure boiling point.

2. A system as in claim 1 where said exhaust of said low temperature steam turbine is at substantially or below ambient air pressure but is at a temperature so that the exhaust is not totally dry or too wet.

3. A system as in claim 1 where said solar boiler means provides substantially all of the heat necessary for changing the state of said feed water from liquid to vapor.

4. A system as in claim 1 where said first heat exchanger means includes a low temperature feed water heater located in a downstream portion of said hot exhaust gas and a high temperature feed water heater located in an upstream portion of said hot exhaust gas.

5. A system as in claim 4 where said solar boiler means includes a high pressure solar boiler and a low pressure solar boiler respectively connected to said high and low temperature feed water heaters.

6. A system as in claim 1 where said second heat exchanger means includes high pressure and low pressure superheaters receiving evaporated feed water from said solar boiler means and a low pressure reheater receiving the low pressure exhaust of said high pressure steam turbine generator, said low pressure superheater and said low pressure reheater driving said low pressure steam turbine and said high pressure superheater driving said high pressure steam turbine.

\* \* \* \* \*